US011311927B2

(12) United States Patent
Wu et al.

(10) Patent No.: US 11,311,927 B2
(45) Date of Patent: Apr. 26, 2022

(54) PROCESSING AUXILIARY DEVICE INTEGRATED WITH CLAMPING AND BLANKING FUNCTIONS

(71) Applicant: Jiangnan University, Wuxi (CN)

(72) Inventors: Meiping Wu, Wuxi (CN); Xiaojin Miao, Wuxi (CN); Yiqing Ma, Wuxi (CN); Weipeng Duan, Wuxi (CN); Peipei Lu, Wuxi (CN)

(73) Assignee: Jiangnan University, Wuxi (CN)

( * ) Notice: Subject to any disclaimer, the term of this patent is extended or adjusted under 35 U.S.C. 154(b) by 24 days.

(21) Appl. No.: 16/997,926

(22) Filed: Aug. 19, 2020

(65) Prior Publication Data
US 2021/0138524 A1    May 13, 2021

(30) Foreign Application Priority Data

Nov. 7, 2019  (CN) .......................... 201911083539.7

(51) Int. Cl.
*B21D 28/26*   (2006.01)
*B23Q 3/06*    (2006.01)

(52) U.S. Cl.
CPC .............. *B21D 28/26* (2013.01); *B23Q 3/06* (2013.01)

(58) Field of Classification Search
CPC .......... B25B 11/00; B25B 11/02; B23Q 3/00; B23Q 3/002; B23Q 3/06; B23Q 9/00
USPC ............ 269/55, 289 mr, 37, 291, 29; 26/55, 26/289 mr, 37, 291, 29
See application file for complete search history.

(56) References Cited

U.S. PATENT DOCUMENTS

| 3,828,703 A | * | 8/1974 | Sugland | ................. | D05B 39/00 |
| | | | | | 112/470.09 |
| 5,772,192 A | * | 6/1998 | Hoffmann | ................ | B23Q 1/03 |
| | | | | | 269/37 |
| 9,682,430 B2 | * | 6/2017 | Clark | ...................... | B27B 27/00 |

* cited by examiner

*Primary Examiner* — Lee D Wilson
*Assistant Examiner* — Robert F Neibaur
(74) *Attorney, Agent, or Firm* — Idea Intellectual Limited; Margaret A. Burke; Sam T. Yip

(57) ABSTRACT

The present invention discloses a cutting auxiliary device integrated with clamping and blanking functions includes a positioning and loading unit, a clamping unit and a supporting unit. The supporting unit and the clamping unit can slide left and right on the platform of the positioning and loading unit through the slide block and slide groove structure. The supporting unit and the clamping unit are connected through an adjustable push rod with a scale bar; The board is placed on the positioning platform, and the adjustable push rod is pushed to move the supporting unit and the clamping unit to fix the board again for cutting. After completion, the handwheel is turned to make the clamping platform rotate such that the material is transferred into the material receiving container.

11 Claims, 3 Drawing Sheets

PROCESSING AUXILIARY DEVICE INTEGRATED WITH CLAMPING AND BLANKING FUNCTIONS

CROSS-REFERENCE TO RELATED APPLICATION

This application claims priority from the Chinese Patent Application Number 201911083539.7 filed on Nov. 7, 2019, and the disclosure of which is incorporated herein by reference in its entirety.

FIELD OF THE INVENTION

The present invention relates to the technical field of mechanical processing, in particular to a cutting auxiliary device suitable for various cutting technologies and can achieve conveniently positioning, clamping and blanking in the process of cutting.

BACKGROUND

In recent years, abrasive water jet, laser and other modern cutting technologies have the advantages of strong cutting ability, good cutting quality and high cutting efficiency, and are often used to cut all kinds of difficult-to-process materials with high hardness, high strength and high brittleness.

Before cutting, the materials need to be positioned and clamped, then the materials need to be collected and stored after cutting, and then be positioned and clamped for the next round. During the process, a lot of non-cutting time is generated, which seriously affects the cutting efficiency.

SUMMARY OF THE INVENTION

This section aims to summarize some aspects of the embodiments of the present invention and to briefly describe some preferred embodiments. The simplification or omission may be made in this section, the abstract of the specification, and the title to avoid obscuring the purpose of this section, the abstract of the specification, and the title. Such simplification or omission may not be used to limit the scope of the present invention.

The present invention has been made in view of the above-mentioned technical drawbacks and provide a cutting auxiliary device integrated with clamping and blanking functions. The device is configured with a positioning and loading unit, supporting unit, and a clamping and collecting unit to realize integration of clamping and blanking of board materials, and improve practical performance of the clamping fixture, greatly reduce the non-cutting time, and improve the cutting efficiency. With the adjustable push rod, the clamping fixture can adapt to various applications and meet the requirement of different cutting sizes.

DETAILED DESCRIPTION

Embodiment 1

Figure 1:
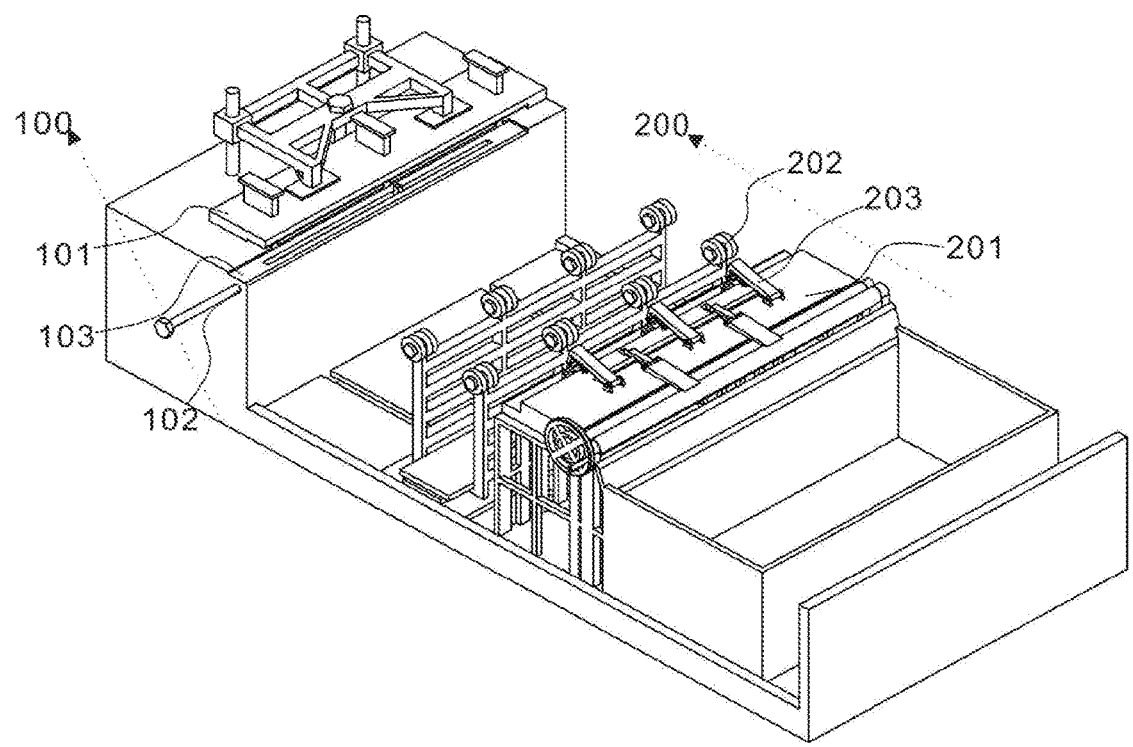
FIG. 1 is a schematic diagram of the overall structure of the cutting auxiliary device integrated with clamping and blanking functions.

Referring to FIG. 1, for one embodiment of the present invention, the schematic diagram of the cutting auxiliary device integrated with clamping and blanking functions is provided. The integrated cutting auxiliary device includes a positioning and loading unit 100 and a clamping unit 200; wherein the positioning and loading unit 100 includes an upper pressing plate 101 for constructing a positioning space (S), a lateral-pressing-block sliding groove 102, and a lateral pressing block 103. The upper pressing plate 101 is configured to slide on the lateral pressing block sliding groove 102 and the lateral pressing block 103 is configured to slide left and right in the lateral-pressing-block sliding groove 102. More specifically, the clamping unit 200 includes a clamping platform 201, a push rod 202, and a pressure bar 203. One end of the pressure bar 203 is hinged with the clamping platform 201, and the other end is configured to move downward to clamp the board (M). The push rod 202 is embedded in the clamping platform 201, and one end of the push rod 202 is configured to flush against one edge of the board (M) and the other end of the push rod 202 is configured to flush against the pressure bar 203 so as to drive the pressure bar 203 to move up and down.

Figure 2:
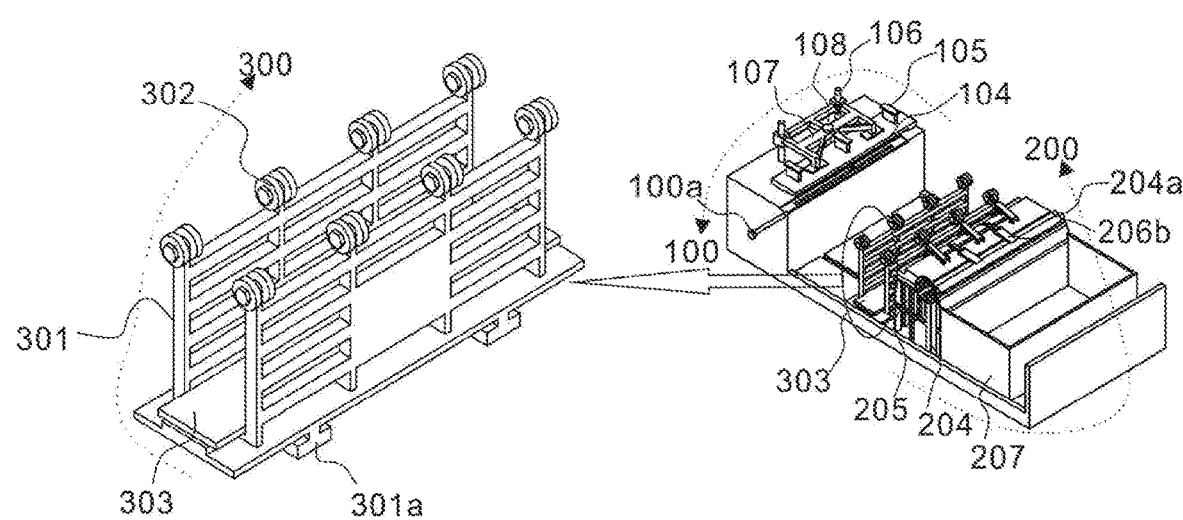
FIG. 2 is a schematic diagram of the supporting unit of the cutting auxiliary device integrated with clamping and blanking functions.
Figure 3:
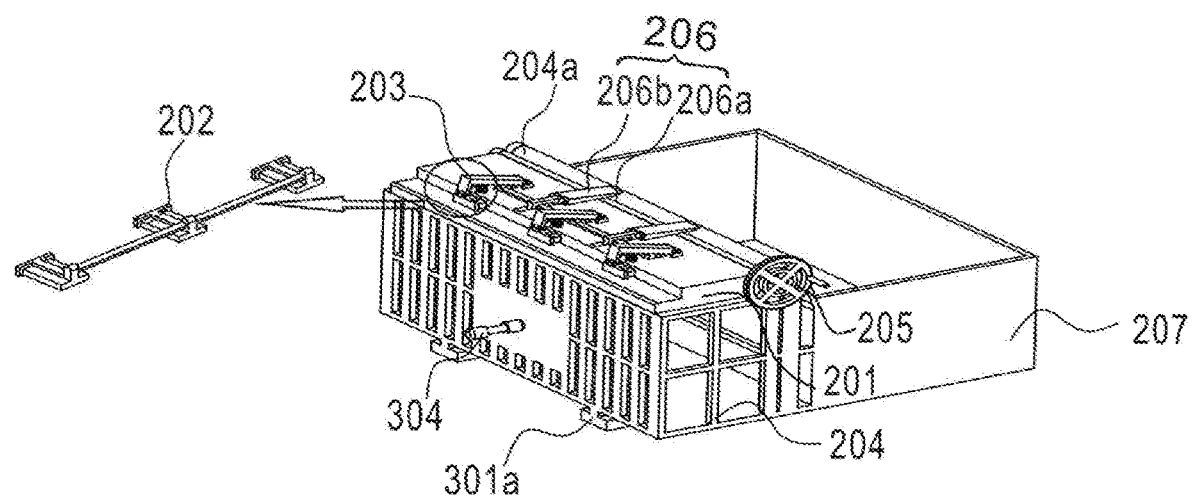
FIG. 3 is a schematic diagram of the clamping and collecting unit of the cutting auxiliary device integrated with clamping and blanking functions.

Furthermore, referring to FIG. 2 and FIG. 3, the cutting auxiliary device integrated with clamping and blanking functions further comprises a supporting unit 300, wherein the supporting unit 300 includes an adjustable push rod 304, which connects the supporting unit 300 and the platform support position-limiting frame 204. The adjustable push rod 304 is further provided with a scale bar 304a for size marking such that the size of the adjustable push rod 304 can be flexibly adjusted and easy to use.

Preferably, the adjustable push rod 304 can be set according to the size of the board (M) to be cut and then the supporting unit 300 and the clamping unit 200 can be moved as a whole slowly. After the other edge of the board (M) reaches the clamping platform 201, the supporting unit 300 and the clamping unit 200 continue to be pushed (towards the board) slowly. During the relative movement of the board (M) to the supporting unit 300 and the clamping unit 200, the board (M) is configured to push the push rod 202 to move such that relative displacement between the push rod 202 and pressure bar 203 is created and the push rod 202 is slowly pushed into the throne groove of the pressure bar 203. At this time, the pressure bar 203 is pulled down by the action of a spring which is originally in tensile state, so as to protect the device from damage.

Embodiment 2

Referring to FIG. 1 and FIG. 2, for another embodiment of the present invention, a supporting unit 300 further comprises a supporting frame 301, rollers 302, and a processing-resistant consumable 303. The bottom of the supporting frame 301 is provided with a T-shaped slide block 301a, wherein the T-shaped slide block 301a is embedded in a groove 102c, the rollers 302 is positioned on the top of the supporting frame 301 with bolts, and the processing resistant consumable 303 is positioned in the middle of the supporting frame 301.

Furthermore, referring back to FIG. 1, the integrated cutting auxiliary device includes a positioning and loading unit 100 and a clamping unit 200; wherein the positioning and loading unit 100 includes an upper pressing plate 101 for constructing a positioning space (S) comprising, a lateral-pressing-block sliding groove 102, and a lateral pressing block 103. The upper pressing plate 101 is configured to slide on the lateral-pressing-block sliding groove 102 and the lateral pressing block 103 is configured to slide left and right in the lateral-pressing-block sliding groove 102. More specifically, the clamping unit 200 includes a clamping platform 201, a push rod 202, and a pressure bar 203. One end of the pressure bar 203 is hinged with the clamping platform 201, and the other end is configured to move downward to clamp the board (M). The push rod 202 is embedded in the clamping platform 201, and one end of the push rod 202 is configured to flush against one edge of the board (M) and the other end of the push rod 202 is configured to flush against the pressure bar 203 so as to drive the up and down movement of the pressure bar 203.

More specifically, the rollers 302 of the supporting unit 300 is positioned on the top end of the supporting frame 301 with bolts so as to transport and support the board (M). The processing-resistant consumable 303 (which may be made of bioceramics) is placed in the middle of the supporting frame 301 such that the auxiliary device can be protected from damage by high-energy beams, for examples, jet and laser beams during cutting process. More specifically, when a mechanical cutter or high-energy beam cutter is used to cut the board (M) placed between the two rows of the rollers 302 of the support unit 300, the rollers 302 may play a crucial role for supporting the board (M) and the processing resistant consumable 303 positioned at the middle and lower parts of the supporting unit 300 may play a role to protect the device from further damage.

Embodiment 3

Figure 5:
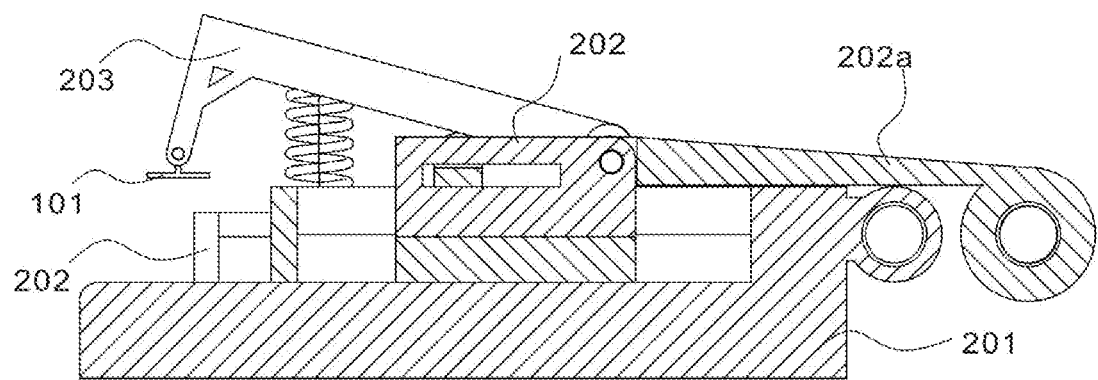
FIG. 5 is a section view of the clamping system of the clamping and collecting unit of the cutting auxiliary device integrated with clamping and blanking functions.

Referring to FIG. 3 and FIG. 5, for the other embodiment of the present invention, the clamping unit 200 further comprises a platform support position-limiting frame 204, a handwheel 205, a blanking system 206 and a material receiving container 207. The platform support position-limiting frame 204 is connected to the clamping platform 201 with the rotating shaft 204a, and the clamping platform 201 can rotate around the rotating shaft 204a in a certain angle; The handwheel 205 is connected to the rotating shaft 204a which is positioned between the platform support position-limiting frame 204 and the clamping platform 201, and the clamping platform 201 can be driven to rotate around the rotating shaft 204a by rotating the handwheel 205; the blanking system 206 includes a blanking rotating shaft 206a and a position-limiting connecting rod 206b, wherein the blanking rotating shaft 206a is fixedly connected with one end of the position-limiting connecting rod 206b and the other end of the position-limiting connecting rod 206b is hinged with one end of the push rod 202; The push rod 202 is configured in the T-shaped groove 201a of the clamping platform 201 such that the push rod 202 can slide in the T-shaped groove 201a and the push rod 202 is connected to the connecting rod 202a; The material receiving container 207 is configured on one side of the clamping platform 201, a sliding block 207a is positioned at the bottom of the material receiving container 207, and the material receiving container 207 is fixedly connected to the platform support position-limiting frame 204.

More specifically, referring to FIG. 1, the integrated cutting auxiliary device includes a positioning and loading unit 100 and a clamping unit 200; wherein the positioning and loading unit 100 includes an upper pressing plate 101 for constructing a positioning space (S), a lateral-pressing-block sliding groove 102, and a lateral pressing block 103. The upper pressing plate 101 is configured to slide on the lateral pressing block sliding groove 102 and the lateral pressing block 103 is configured to slide left and right in the lateral-pressing-block sliding groove 102. More specifically, the clamping unit 200 includes a clamping platform 201, a push rod 202, and a pressure bar 203. One end of the pressure bar 203 is hinged with the clamping platform 201, and the other end is configured to move downward to clamp the board (M). The push rod 202 is embedded in the clamping platform 201, and one end of the push rod 202 is configured to flush against one edge of the board (M) and the other end of the push rod 202 is configured to flush against the pressure bar 203 so as to drive the pressure bar 203 to move up and down.

Furthermore, referring to FIG. 2 and FIG. 3, the cutting auxiliary device integrated with clamping and blanking functions further comprises a supporting unit 300, wherein the supporting unit 300 includes an adjustable push rod 304, which connects the supporting unit 300 and the platform support position-limiting frame 204. The adjustable push rod 304 is further provided with a scale bar 304a for size marking such that the size of the push rod 304 can be flexibly adjusted and easy to use.

Preferably, after cutting, while the cut off material is still being clamped on the clamping platform 201, the handwheel 205 may be turned so that the clamping platform 201 may start to rotate around the rotating shaft 204a, to cause relative displacement between the clamping platform 201 and the connecting rod 206b is caused. Under the action of the connecting rod 206b, relative displacement between the push rod 202 and the clamping platform 201 is also caused. The relative displacement of the push rod 202 causes the connecting rod 202a on the push rod 202 to be pushed, leading the movement of the push rod 202 until it exists from the throne groove of the pressure bar 203 and then the pressure bar 203 is lifted up again. Then the cut off material is released, and with the further rotation of the clamping platform 201, the material falls into the material receiving container 207.

Embodiment 4

Figure 4:
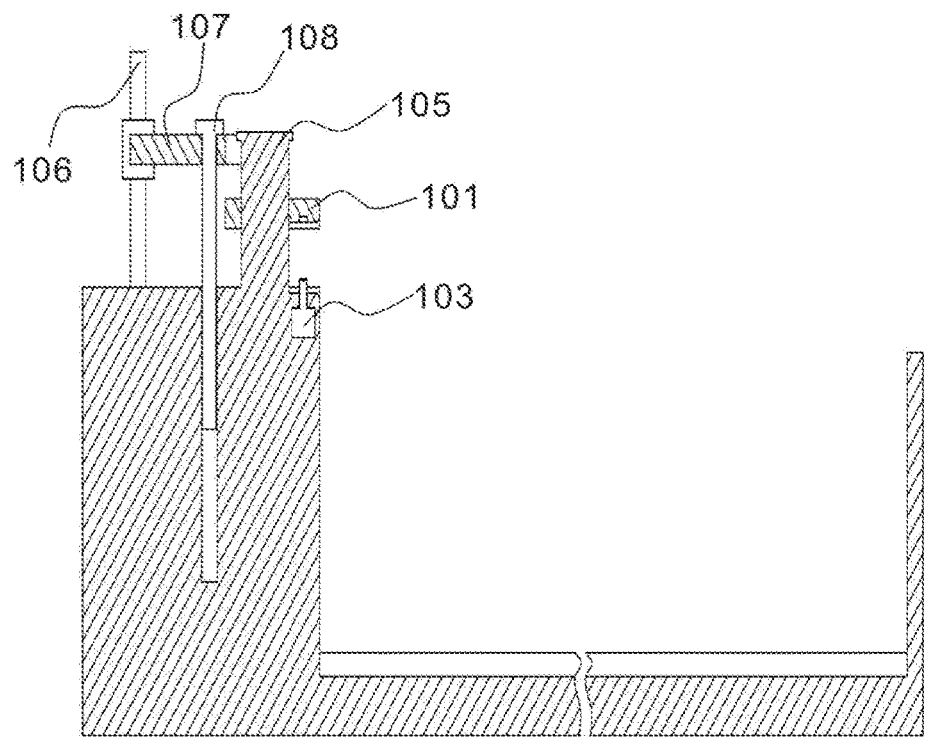
FIG. 4 is a section view of the positioning and loading unit of the cutting auxiliary device integrated with clamping and blanking functions.

Referring to FIG. 1, FIG. 2 and FIG. 4, for the other embodiment of the present invention, the positioning and loading unit 100 further comprises an upper-pressing-plate-position-limiting sliding block 105, an upper-pressing-body sliding rod 106, and an upper pressing bolt 108, wherein a upper pressing body 107 and a positioning platform 104 are connected together with the upper pressing bolt 108, and by adjusting the bolts the upper pressing body 107 may be configured to press downward along the upper-pressing-body sliding rod 106 and the upper pressing plate 101 may be further driven to press downward along the upper-pressing-plate-position-limiting sliding block 105. The side pressing push rod 100a is configured in the positioning space S, wherein one end of the side pressing push rod 100a passes through the positioning platform 104 and is positioned behind the lateral pressing block 103. The side pressing push rod 100a pushes the lateral pressing block 103 so as to compress the board (M) tightly.

More specifically, referring to FIG. 1, the integrated cutting auxiliary device includes a positioning and loading unit 100 and a clamping unit 200; wherein the positioning and loading unit 100 includes an upper pressing plate 101 for constructing a positioning space (S), a lateral-pressing-block sliding groove 102, and a lateral pressing block 103. The upper pressing plate 101 is configured to slide on the lateral pressing block sliding groove 102 and the lateral pressing block 103 is configured to slide left and right in the lateral-pressing-block sliding groove 102. More specifically, the clamping unit 200 includes a clamping platform 201, a push rod 202, and a pressure bar 203. One end of the pressure bar 203 is hinged with the clamping platform 201, and the other end is configured to move downward to clamp the board (M). The push rod 202 is embedded in the clamping platform 201, and one end of the push rod 202 is configured to flush against the board (M) and the other end of the push rod 202 is configured to flush against the pressure bar 203 so as to drive the up and down movement of the pressure bar 203.

Furthermore, the cutting auxiliary device integrated with clamping and blanking functions further comprises a supporting unit 300, wherein the supporting unit 300 includes an adjustable push rod 304, which connects the supporting unit 300 and the platform support position-limiting frame 204. The adjustable push rod 304 is further provided with a scale bar 304a for size marking such that the size of the push rod 304 can be flexibly adjusted and easy to use.

Preferably, when in use, the board (M) may be loaded to the integrated cutting auxiliary device by the following steps: loosening the upper pressing bolt 108, lifting the upper pressing plate 101 and the upper pressing body 107, placing one end of the board (M) on the positioning platform 104, pressing down the upper pressing plate 101, then pressing down the upper pressing body 107, followed by tightening the side pressing push rod 100a. During the process of tightening the side pressing push rod 100a, the upper pressing bolt 108 is tightened at the same time to position the board (M) preliminarily.

The invention claimed is:

1. A cutting auxiliary device integrated with clamping and blanking functions, comprising: a positioning and loading unit, wherein the positioning and loading unit comprising a positioning space; a clamping unit, wherein the clamping unit comprising a clamping platform; a push rod; a pressure bar; wherein one end of the pressure bar is hinged with the clamping platform, and the other end of the pressure bar is configured to move downward to clamp a board; wherein the push rod is embedded in the clamping platform, one end of the push rod is configured to flush against the board, and the other end of the push rod is configured to flush against the pressure bar so as to drive the pressure bar to move up and down; wherein the clamping unit further includes a groove and a supporting unit; wherein the supporting unit is configured to slide left and right in the clamping unit.

2. The cutting auxiliary device integrated with clamping and blanking functions of claim 1, wherein the positioning and loading unit further comprises a positioning platform, an upper pressing plate, an upper-pressing-plate-position-limiting sliding block, an upper-pressing-body sliding rod, and an upper pressing body; wherein the upper pressing body is positioned on the upper pressing plate such that the upper pressing body can slide up and down along the upper-pressing-body sliding rod; wherein the upper-pressing-plate-position-limiting sliding block is positioned on the positioning platform such that the upper pressing plate can slide up and down.

3. The cutting auxiliary device integrated with clamping and blanking functions of claim 1, wherein the positioning and loading unit further comprises an upper pressing bolt and a lateral-pressing-block upper pressing bolt; wherein the upper pressing bolt connects a pressing body with a positioning platform; wherein the pressing body is configured to move downward by adjusting an upper pressing bolt and further drive the upper pressing plate downward; wherein the lateral-pressing-block upper pressing bolt is embedded in a lateral-pressing-block sliding groove such that the lateral-pressing-block upper pressing bolt can slide left and right in the groove.

4. The cutting auxiliary device integrated with clamping and blanking functions of claim 2, wherein the positioning and loading unit further comprises an upper pressing bolt and a lateral-pressing-block upper pressing bolt; wherein the upper pressing bolt connects the pressing body with the positioning platform; wherein the pressing body is configured to move downward by adjusting the upper pressing bolt and further drive the upper pressing plate downward; wherein the lateral-pressing-block upper pressing bolt is embedded in a lateral-pressing-block sliding groove such that the lateral-pressing-block upper pressing bolt can slide left and right in a groove.

5. The cutting auxiliary device integrated with clamping and blanking functions of claim 1, wherein the positioning space further comprises a side-pressing push rod, a positioning platform, and a lateral pressing block; wherein one end of the side-pressing push rod passes through the positioning platform and is positioned behind the lateral pressing block: wherein the side-pressing push rod pushes the lateral pressing block so as to compress the board.

6. The cutting auxiliary device integrated with clamping and blanking functions of claim 1, wherein the supporting unit comprises a supporting frame, rollers, and a processing resistant consumable: wherein a bottom of the supporting frame has a T-shaped slide block; wherein the T-shaped slide block is embedded in the groove; wherein the rollers are positioned on a top of the supporting frame through bolts; wherein the processing resistant consumable is positioned in a middle of the supporting frame.

7. The cutting auxiliary device integrated with clamping and blanking functions of claim 1, wherein the clamping unit further comprises a platform support position-limiting frame, a handwheel, a blanking system and a material receiving container; wherein the platform support position-limiting frame is connected to the clamping platform by a rotating shaft such that the clamping platform can rotate around the rotating shaft in a certain angle; wherein the handwheel is connected with the rotating shaft, the rotating shaft is positioned between the platform support position-limiting frame and the clamping platform such that the clamping platform can rotate around the rotating shaft by rotating the handwheel.

8. The cutting auxiliary device integrated with clamping and blanking functions of claim 1, further comprising a blanking system, wherein the blanking system comprises a blanking rotating shaft and a position-limiting connecting rod; wherein the blanking rotating shaft is connected to one end of the position-limiting connecting rod and the other end of the position-limiting connecting rod is hinged with one end of the push rod; wherein the push rod is configured to a T-shaped groove of the clamping platform such that the push rod can slide in the T-shaped groove, and the push rod is connected through a connecting rod.

9. The cutting auxiliary device integrated with clamping and blanking functions of claim 7, further comprising a blanking system, wherein the blanking system comprises a blanking rotating shaft and a position-limiting connecting rod; wherein the blanking rotating shaft is connected to one end of the position-limiting connecting rod and the other end of the position-limiting connecting rod is hinged with one end of the push rod; wherein the push rod is configured to a T-shaped groove of the clamping platform such that the push rod can slide in the T-shaped groove, and the push rod is connected through a connecting rod.

10. The cutting auxiliary device integrated with clamping and blanking functions of claim 7, wherein the material receiving container is configured on one side of the clamping platform; wherein a sliding block is configured at a bottom of the material receiving container, and the material receiving container is connected with the platform support position-limiting frame.

11. The cutting auxiliary device integrated with clamping and blanking functions of claim 6, wherein the supporting unit further comprises an adjustable push rod; wherein the adjustable push rod connects the supporting unit and the platform support position-limiting frame; wherein the adjustable push rod has a scale bar and a size of the adjustable push rod is adjustable.

\* \* \* \* \*